US012737236B2

(12) United States Patent
Arumugam et al.

(10) Patent No.: US 12,737,236 B2
(45) Date of Patent: Sep. 15, 2026

(54) METHODS AND SYSTEMS FOR SCHEMA DRIVEN CLOUD RESOURCE DISCOVERY AND INVENTORY

(71) Applicants: Rathinasabapathy Arumugam, Chennai (IN); Satyabrat Chowdhury, Chennai (IN)

(72) Inventors: Rathinasabapathy Arumugam, Chennai (IN); Satyabrat Chowdhury, Chennai (IN)

(*) Notice: Subject to any disclaimer, the term of this patent is extended or adjusted under 35 U.S.C. 154(b) by 1117 days.

(21) Appl. No.: 17/500,323

(22) Filed: Oct. 13, 2021

(65) Prior Publication Data

US 2023/0114953 A1 Apr. 13, 2023

(51) Int. Cl.
*G06F 9/50* (2006.01)
*G06F 8/35* (2018.01)
*G06F 8/41* (2018.01)
*G06F 9/54* (2006.01)

(52) U.S. Cl.
CPC .............. *G06F 9/5072* (2013.01); *G06F 8/35* (2013.01); *G06F 8/433* (2013.01); *G06F 9/547* (2013.01)

(58) Field of Classification Search
None
See application file for complete search history.

(56) References Cited

U.S. PATENT DOCUMENTS 10,915,378 B1 * 2/2021 Mary ........................ G06F 9/54
11,218,421 B1 * 1/2022 Khan .................. H04L 41/0897
2013/0080536 A1 * 3/2013 Rolia ...................... G06F 15/16 709/204
2014/0040473 A1 * 2/2014 Ho ........................ G06F 9/5072 709/226
2014/0201372 A1 * 7/2014 Bauer ..................... H04L 67/75 709/226
2016/0127454 A1 * 5/2016 Maheshwari ........... H04L 67/10 709/223
2017/0048314 A1 * 2/2017 Aerdts .................. G06F 9/5072
2018/0203744 A1 * 7/2018 Wiesmaier .............. G06F 9/505
2019/0066694 A1 * 2/2019 Hirzel ...................... G10L 17/22
2019/0342166 A1 * 11/2019 Chaware ............. H04L 41/0806
2021/0216435 A1 * 7/2021 Godefroid ........... G06F 11/3676
2023/0088655 A1 * 3/2023 O'Dell ................ G06F 11/3684 717/126

OTHER PUBLICATIONS

Santos et al.; "Analysis of Tools for REST Contract Specification in Swagger/OpenAPI"; In Proceedings of the 22nd International Conference on Enterprise Information Systems (ICEIS 2020)—vol. 2, pp. 201-208; DOI: 10.5220/0009381202010208 (Santos_2020.pdf) (Year: 2020).*

* cited by examiner

*Primary Examiner* — Hiren P Patel

(57) ABSTRACT

In one aspect, a computerized cloud resource model (CRM) implementing a schema driven cloud resource discovery and inventory by: defining a resource characteristic, a hierarchy characteristic, a dependency characteristic, and an action characteristic in a declarative model for a cloud resource. Discovering a cloud-resource comprising the resource characteristic, the hierarchy characteristic, the dependency characteristic, and the action characteristic represented as a set of objects in the cloud-resource model; and embedding the cloud-resource model in an open API specification that is readable by any human or systems.

9 Claims, 6 Drawing Sheets

METHODS AND SYSTEMS FOR SCHEMA DRIVEN CLOUD RESOURCE DISCOVERY AND INVENTORY

BACKGROUND

Cloud service providers are rapidly releasing new services and evolving the depth of existing services through lot more granularity in resources and resource composition. Traditional integration methods are proving to be inadequate in the fast-evolving cloud world. Accordingly, there is a need to represent the cloud services and resources in a structured way for a more effective cloud service governance/management.

In a traditional model of cloud service/resource discovery is implemented through various REST API's and/or SDKs published by the cloud service providers. While REST API's are available immediately, it may take time to update programming language specific SDKs to be released. However, in both of these cases, there is a learning cycle to understand the structure and make specific implementation to discover cloud resources, operations, and actions.

Additionally, there is also a need to represent the cloud services and resources in a structured way (otherwise referred as inventory) for a more effective cloud service governance/management. It is important to have a low touch integration for discovery and inventory management in any areas including and not limited to cloud management, governance, compliance, optimization to enable end users consume the newly published services and resources in no time with minimal effort.

SUMMARY OF THE INVENTION

In one aspect, a method for implementing a schema driven cloud resource discovery and inventory includes generating a cloud-resource model during a cloud-resource discovery process by: defining a resource characteristic, a hierarchy characteristic, a dependency characteristic, and an action characteristic in a declarative model of a cloud resource. generating a cloud-resource model comprising the resource characteristic, the hierarchy characteristic, the dependency characteristic, and the action characteristic represented as a set of objects in the cloud-resource model; and embedding the cloud-resource model in an open API specification such that the cloud resource model and the set of objects are defined by the cloud resource modeler through the open API specification.

Figure 1:
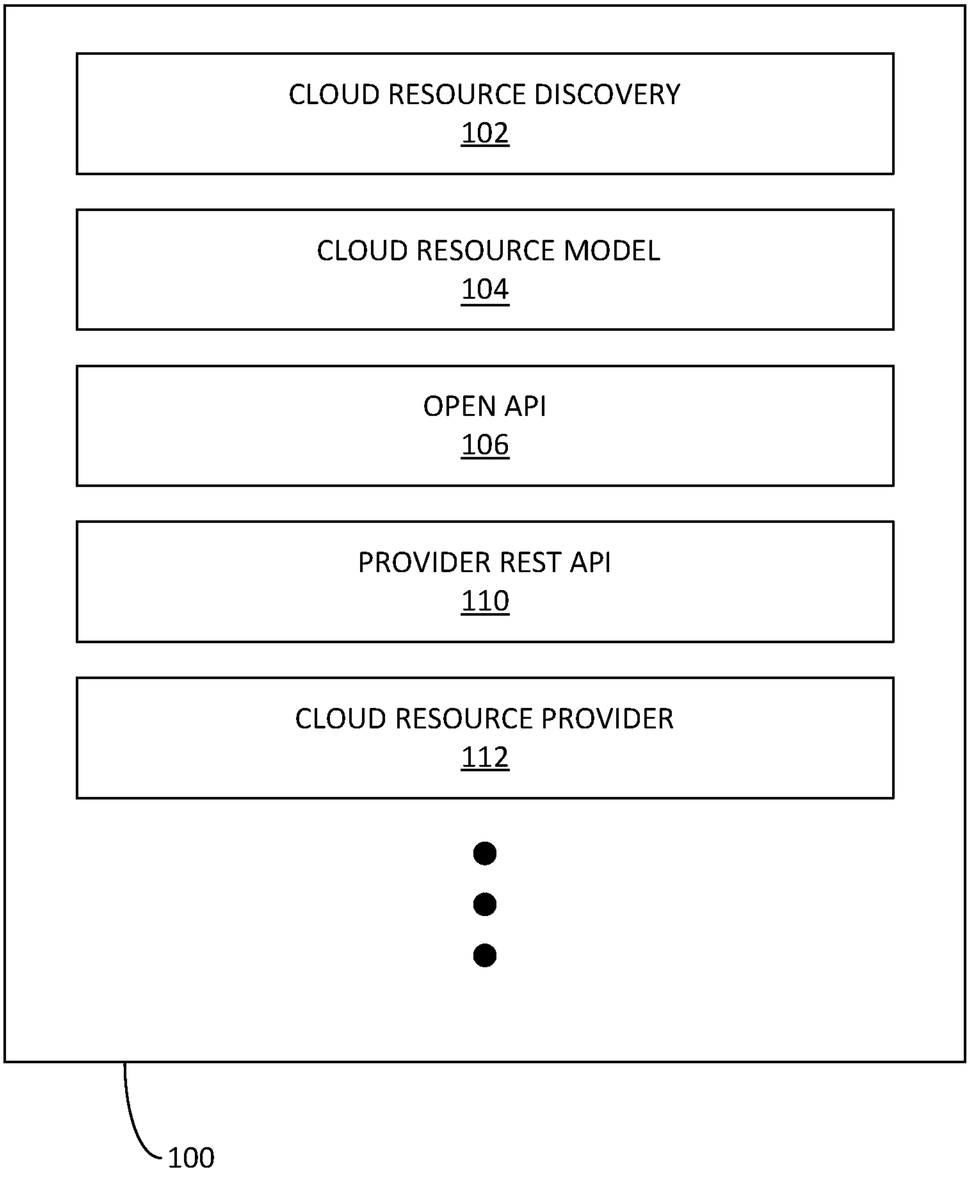
FIG. 1 is a schematic representation of cloud resource model (CRM) discovery, according to some embodiments.

The Figures described above are a representative set and are not an exhaustive with respect to embodying the invention.

DESCRIPTION

Disclosed are a system, method, and article of manufacture for schema driven cloud resource discovery and inventory. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Amazon Elastic Compute Cloud (EC2) is a commercial web service for hosting computer applications.

Amazon Relational Database Service (RDS) is a cloud-based relational database service.

Amazon S3 (S3) is an online data-storage service.

Cloud computing architecture refers to the components and subcomponents required for cloud computing. These components typically consist of a front-end platform (fat client, thin client, mobile), back-end platforms (servers, storage), a cloud-based delivery, and a network (Internet, Intranet, Intercloud). Combined, these components can make up cloud computing architecture.

Cloud resource model (CRM) provides ability to define resource characteristics, Hierarchy, dependencies, and its action in a declarative model and embed them in Open API specification. CRM allows both humans and computers to understand and discover capabilities and characteristics of cloud service and its resources.

MIME type (i.e. media type) is a two-part identifier for file formats and format contents transmitted on the Internet.

Representational state transfer (REST) is a software architectural style that was created to guide the design and development of the architecture for the World Wide Web. REST defines a set of constraints for how the architecture of an Internet-scale distributed hypermedia system, such as the Web, should behave. The REST architectural style emphasizes the scalability of interactions between components, uniform interfaces, independent deployment of components, and the creation of a layered architecture to facilitate caching components to reduce user-perceived latency, enforce security, and encapsulate legacy systems.

Swagger is an Interface Description Language for describing RESTful APIs expressed using JSON. Swagger can be used together with a set of open-source software tools to design, build, document, and use RESTful web services. Swagger includes automated documentation, code generation (e.g. into many programming languages), and test-case generation.

Example Systems and Methods

FIG. 1 is a schematic representation of cloud resource model (CRM) 100, according to some embodiments. Resource Discovery Engine using CRM Model 100 can provide for schema driven cloud-resource discovery and inventory. Resource Discovery Engine using CRM Model 100 can provide a connector less or no code way of discovering cloud resources, persisting them as cloud inventory with its hierarchy and relationship dynamically and efficiently. Resource Discovery Engine using CRM Model 100 can be a replacement for manual coding effort required to build a connector for API and it reduces the effort required for maintenance if there are any changes in the REST API structure.

Resource Discovery Engine using CRM Model 100 can provide a low touch integration for discovery and inventory management in any areas including and not limited to cloud management, governance, compliance, optimization to enable end users consume the newly published services and resources in no time with minimal effort. The new schema-based mechanism utilized by Resource Discovery Engine using CRM Model 100 can be based on the combination of standard based REST API schema embedded with CRM (e.g. henceforth referred as CRM in this document). CRM enables any user to define the Cloud services with its hierarchy and characteristics in No-Code way. The CRM can then be consumed by various ways to present the Cloud resource in a structured manner. CRM can help the UI layer in a structured representation. CRM can help various management and governance functions to automate the actions/operations of the specific cloud service/resource with the characteristics enriched mode.

More specifically, cloud resource model 104 can provide the ability to define resource characteristics, hierarchy, dependencies, and its action in a declarative model and embed them in an Open API specification 106. CRM 100 allows both humans and computers to understand and discover capabilities and characteristics of cloud service and its resources. The characteristics of resources are represented as objects in the cloud resource modelling. A cloud-resource model can include consists of the following objects, resource hierarchy object, relationship object, dependencies object, SKU object, billing object, pricing object, metric object, action objects etc.

It is noted that the characteristics of a cloud resource can have many dimensions starting from the source metadata such as, inter alia: which cloud/region/resource group, how it is related to other cloud resources, various ways to track resource usage, what are the monitoring characteristics, etc. The hierarchy characteristics can provide how a resource hierarchy defines how a resource is positioned as compared to other cloud resources. It defines the broader category that a resource belongs to such as compute, network, storages, database, etc.

The dependency characteristics can provide how a cloud resource is most often in either an association or a parent/child relationship with another cloud resource. A discovery of a child resource operation can be auto triggered once a parent resource is discovered.

The action characteristics can provide how each cloud resource has different management actions for operation and management of the specific resource. Such actions can be defined through the action characteristics.

A SKU object can be a billing object that defines whether a cloud resource is a billable resource. It is noted that not all the resources in cloud are billable. A pricing object can define the pricing method for a cloud resource. There can be multiple pricing method for a cloud resource such as One time upfront, recurring daily/monthly or completely usage based.

A metric object can define the monitoring method. This can provide whether the metric is available as a free monitoring metric or a paid one. The pricing object can provide the units of measurement with the dimensions such as average, aggregate, sum, etc.

Cloud resource modeler 104 embeds the operations of a resource through open API specification 106 which represents provider REST API 110 structure of the cloud-resource provider 112 for all operations. Each cloud resource and its characteristics objects are defined in the cloud resource model 104 through open API specification 106. Cloud resource model 104 interpreter helps in interpreting the object defined in the model and help cloud-resource discovery system 102 in dynamically discovering various objects during discovery process. The discovered resource along with its characteristics object then form a cloud resource inventory upon completion of the discovery process. Cloud resource inventory is a unified representation of any cloud resource that has many characteristics based on every organizations business objectives. Resource Discovery Engine using CRM Model 100 can be used to implement CRM 214.

CRM is now discussed in additional detail. CRM is a method to connect with cloud services from multiple end points with single or multiple authorization models in declarative model that helps in discovering resources, establishing relationship between resources, presenting a tree-based representation and classification of resource types with operations, cost, compliance, reporting along with performing Orchestration and management action of cloud resources. CRM provides standard for defining Resource characteristics, Hierarchy, dependencies, and its actions in OAS. CRM allows both humans and computers to understand and discover capabilities and characteristics of service resources. CRM enables to discover resources along with its characteristics using connector less model or schema-based model. A CRM can maintain pace with cloud-services agility. CRM can reduce time for new service on boarding. CRM can scale support for various tools/services. CRM can reduce maintenance time. CRM can extend support without coding effort. It is noted that as used herein in, 'real time' can include various processing latencies, networking latencies, etc.

Figure 2:
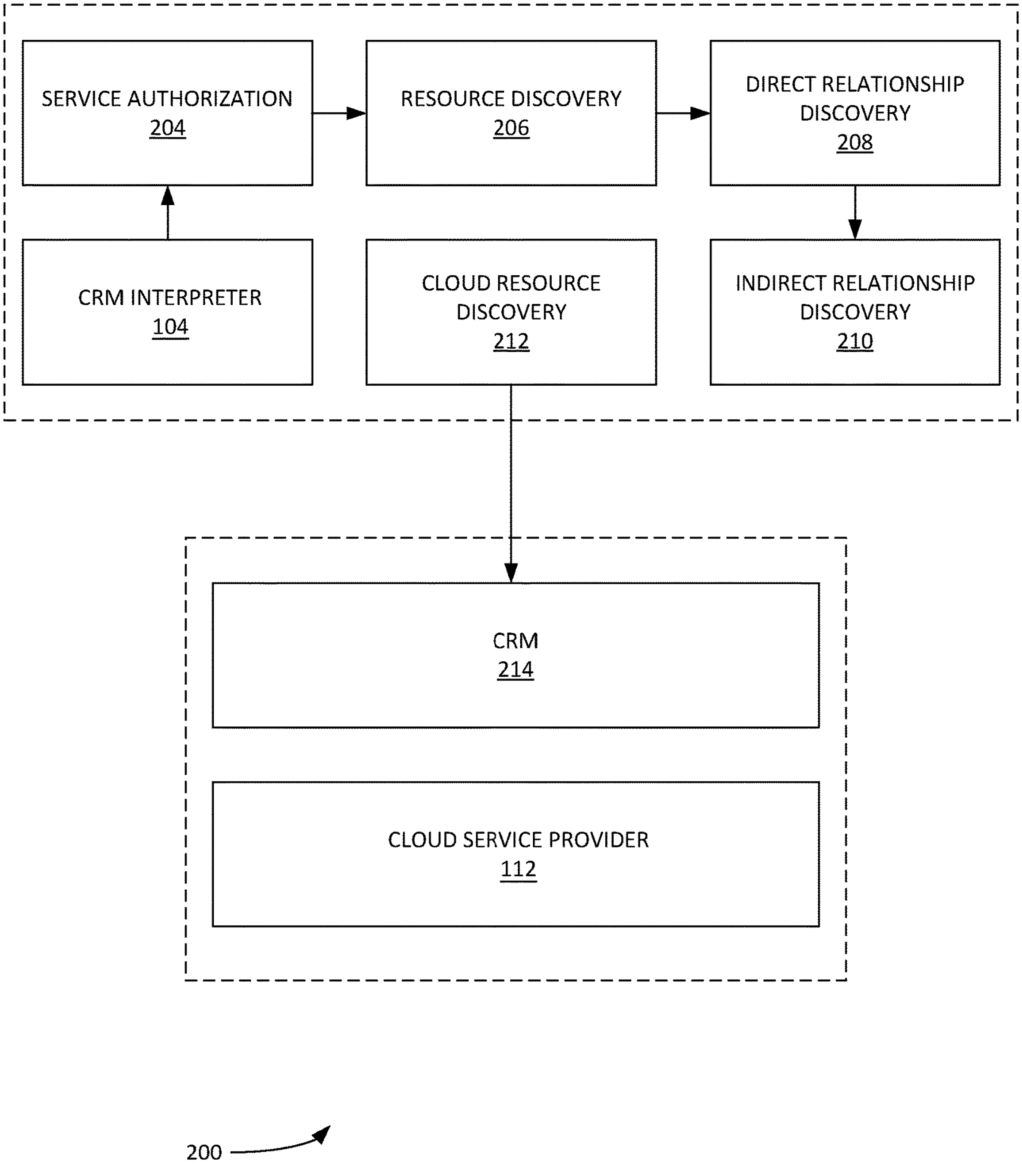
FIG. 2 illustrates an example system used to implement a cloud resource discovery with CRM, according to some embodiments.

FIG. 2 illustrates an example system 200 used to implement a cloud resource discovery with CRM, according to some embodiments. Cloud resource discovery 212 can be implemented with CRM interpreter 104. As noted, CRM interpreter 104 can interpreting an object defined in the model and help CRM operations in dynamically discovering various objects during discovery process, etc. Cloud resource discovery 212 can also implement service authorization 204, resource discovery 206, direct resource discovery 208, indirect resource discovery 210, etc.

A Resource Discovery Engine (e.g. Resource Discovery Engine using CRM Model 100, etc.) that can be used for various resource discovery processes is now discussed. In some examples, a resource discovery engine interprets the CRM through a CRM interpreter and connects to the target cloud endpoint with the specified authentication type to discover various services in the cloud platform. The discovery process goes through a 3-step approach:

First, discovering the resource characteristics and its metadata;

Second, discovering the relationship (e.g. direct or indirect) as defined in the CRM; and and then implementing an advanced discovery based on the relationships discovered in the second step to discover the child and/or associated resources. This can be a recursive process.

CRM 214 can be a schema file that contains the definition for a single or combination of cloud services. The definition can define the following characteristics of a cloud resource (i.e. a resource, etc.). The definition can define an end point and authentication. The end point and authentication can include analysis of the cloud service and understand the authentication. The definition can define a resource hierarchy. The resource hierarchy includes information about grouping and defining hierarchy of various levels on how a cloud resource exist with respect to another resource. There can be different levels while modelling a resource in CRM as well. These can include, inter alia: resource category; resource type; resources; resource relationship; parent/child (e.g. a direct relation); dependent (e.g. direct Relation); Associated (e.g. Indirect Relation); Resource actions; etc. There can be certain actions that can be performed on the resource as well. These actions can be performed only based on certain conditions. That are represented by the constraints in the definition.

Figure 3:
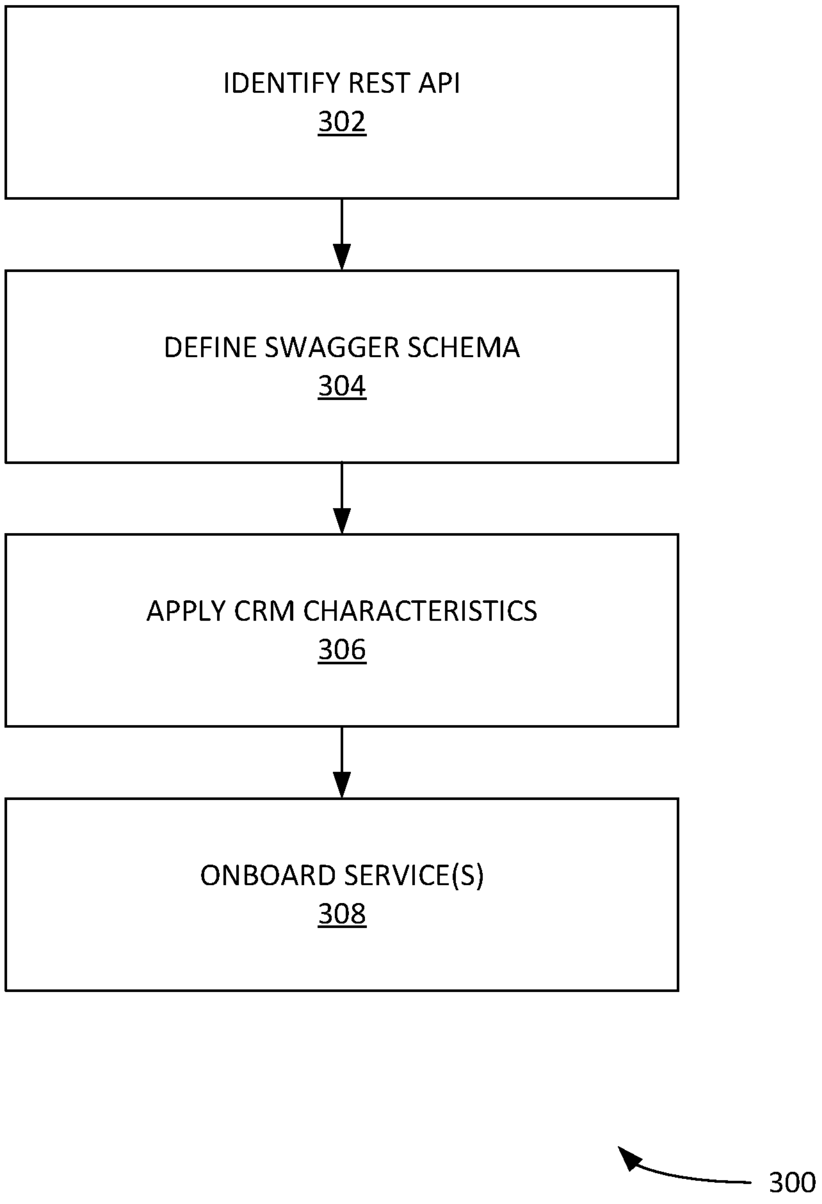
FIG. 3 illustrates an example process for implementing a Schema driven cloud service onboarding life cycle, according to some embodiments.

FIG. 3 illustrates an example process 300 for implementing a schema driven cloud service onboarding life cycle, according to some embodiments. In step 302, process 300 can identify a rest API 302. In step 304, process 300 can define a swagger schema 304. In step 306, process 300 can apply CRM characteristics. In step 308, process 300 can then implement onboard service(s).

Additionally aspect of process 300 are now discussed in further detail. Process 300 can utilize a service end point identification. This can be a first step of cloud service onboarding life cycle. In one example, process 300 can be used in an AWS EC2 service onboarding cycle throughout the life cycle for better clarity and understanding. AWS EC2 Service supports multiple resource types.

The service end point can be provided such that every cloud service provider releases the REST API End point with the release of a new service. The EC2 Service end point is published in this link. Resource Actions can be provided as well. Various EC2 instance resource actions supported by the cloud provider is detailed out in this link.

Process 300 can define an OpenAPI Schema as well. For example, after the service end point and the resource action details are complete, process 300 can first write the Open API schema with the a structure as defined in an Open API specification. This can include, inter alia: a metadata section; a Swagger version (e.g. open API version); an information section (e.g. title, description, contact information, release version); etc. An example is provided as follows:

```
"swagger": "2.0",
"info": {
"description":"CRM For AWS",
"version": "2016-11-15",
"title": "AWS EC2 Resource Listing",
"contact": {
"email": XXXX@corestack.io
```

The base URL is now discussed. A Service Endpoint (as received from the AWS EC2 Service end point) can be specified. The URL version scheme (e.g. either HTTP or HTTPS) can be determined as well. An example of this is now provided:

```
“host”: “ec2.amazonaws.com”,
“schemes”: [
“https”
],
```

Authorization can then be implemented. An example authorization code is now provided:

```
Authorization”: {
“type”: “apiKey”,
“in”: “header”,
“name”: “Authorization”
}
},
```

A consume/produces step can be performed to describe the MIME type supported by the API. An example is as follows:

```
“consumes”: [
“application/xml”
],
“produces”: [
“application/xml”
],
```

A path can be determined. This can be used to define the action/operation as supported by each service resource. An example is as follows:

```
"paths": {
"/?Action=MonitorInstances&Version=2016-11-15": {
```

Parameters can be requested. An example is as follows:

```
"in": "query",
"description": "api query params description",
"required": true,
"type": "string"
},
{
"name": "X-Amz-Algorithm",
"in": "query",
"description": "api query params description",
"required": true,
"type": "string"
},
{
"name": "x-amz-security-token",
"in": "header",
"description": "session token for the temporary generated token from
AWS assume role",
"required": false,
"type": "string"
}
],
```

A response structure can be generated. An example is as follows:

```
"responses": {
"200": {
"description": "Instance Monitor",
"schema": {
"$ref": "#/definitions/MonitorInstancesResponse"
}
},
"default":{
"description": "Error"
}
```

Figure 4:
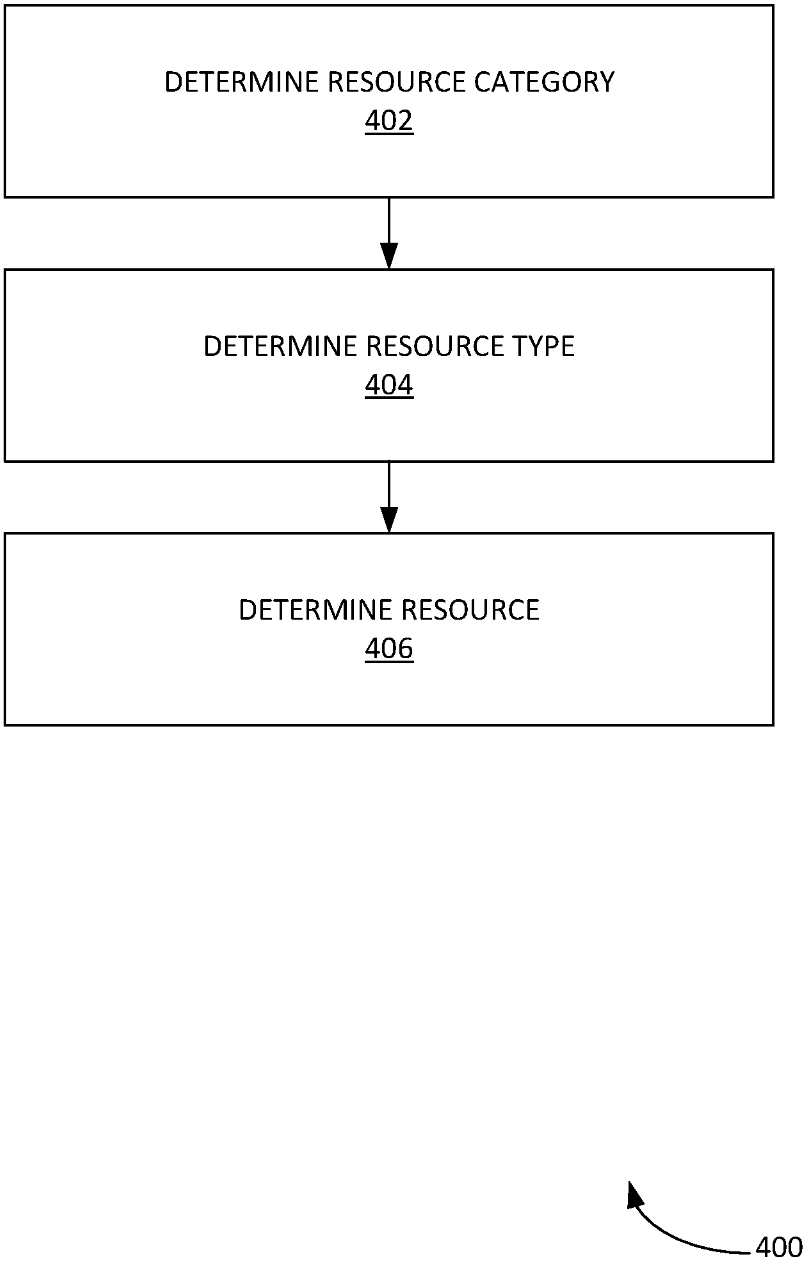
FIG. 4 illustrates an example process for defining a hierarchy of CRM characteristics, according to some embodiments.

As noted supra, process 300 can apply CRM characteristics. FIG. 4 illustrates an example process 400 for defining a hierarchy of CRM characteristics, according to some embodiments. The CRM schema to be defined for every service. The CRM schema can be embedded with an Open API specification schema. Process 400 can use API methods for effective governance to perform this. A hierarchy definition can be generated. The hierarchy definition can define the hierarchy of the cloud service being onboarded.

For example, in step 402, a resource category can be determined. In one example, process 400 can depict AWS EC2 characteristics. This can be x-cs-hierarchy-level-1 (e.g. a resource category). This is the highest level under a cloud provider. The possible values can be, inter alia: compute value, network value, storage value, database value, etc.

In step 404, process 400 can define a resource type. This can be an x-cs-hierarchy-level-2 (e.g. a resource type). This is the second level under a cloud provider. The possible values can be, inter alia: EC2 value, S3 value, RDS value, etc.

In step 406, process 400 can determine a resource. This can be an x-cs-hierarchy-level-3 (e.g. resource). This is the third level under a cloud provider. Under EC2, the third level can include, inter alia: the instances, key pairs, etc. This can be a minimum requirement to onboard a cloud service onto CRM. Various resource discovery characteristics can be defined in the CRM (e.g. see infra, etc.).

Figure 5:
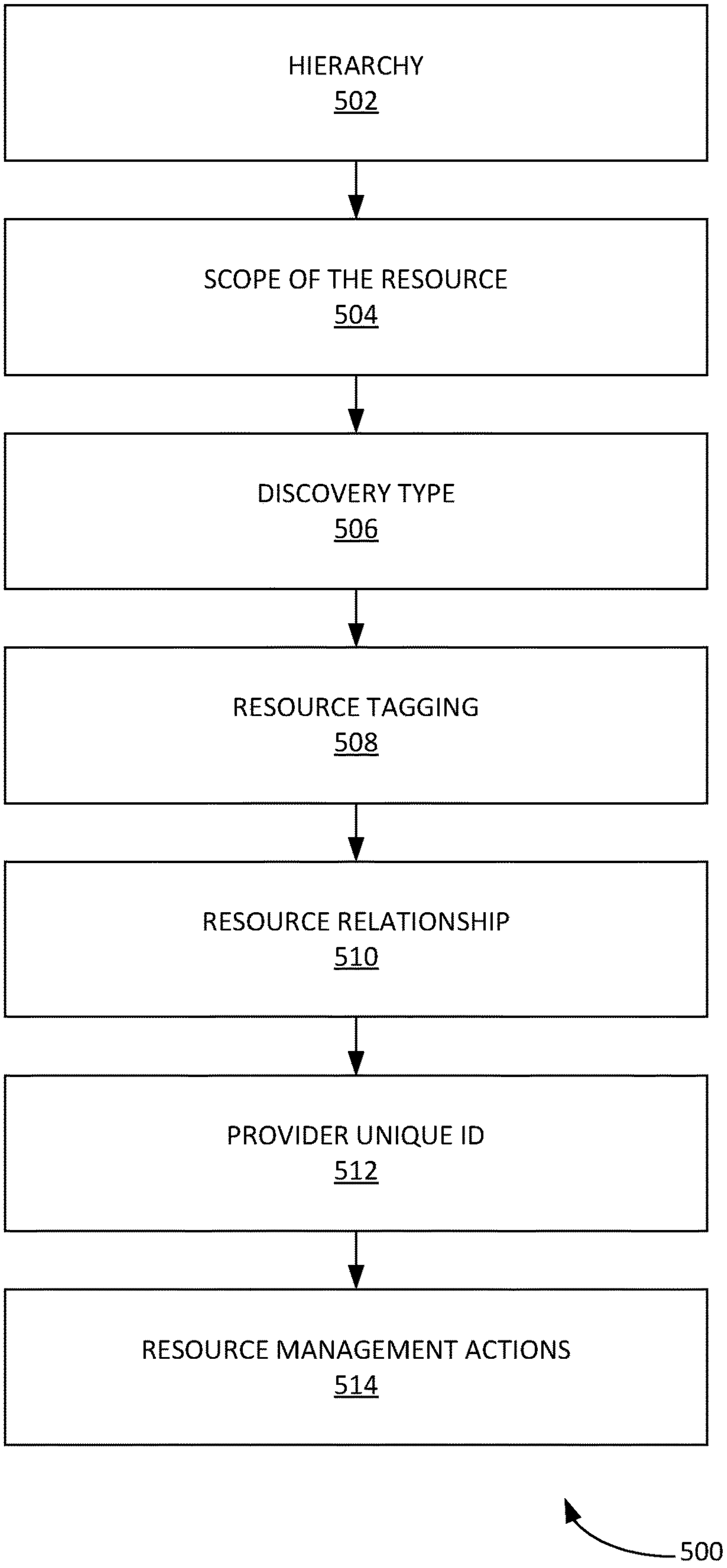
FIG. 5 illustrates an example process for discovery of the resource with a properly modelled CRM, according to some embodiments.

FIG. 5 illustrates an example process 500 for discovery of the resource with a properly modelled CRM, according to some embodiments. Process 500 can service resource discovery characteristics. Once the service is onboarded, process 500 can them implement a detailed discovery of the resource with a properly modelled CRM. This can help in enriching the service resource. In step 502, process 500 can determine a hierarchy of the resource. As discussed in the previous section, a resource is defined at the hierarchy level in the CRM. Process 500 can identify a correct positioning and presentation of a resource while modelling the resource. The AWS EC2 instance comes under compute category and EC2 resource types.

A hierarchy example is as follows:

"x-cs-hierarchy-level-1": "Compute",
"x-cs-hierarchy-level-2": "EC2",
"x-cs-hierarchy-level-3": "Instances", In step 504, process 500 can determine a scope of the resource. The resource can be specific to a region or a common across region. This can be represented as a scope. This specific attribute helps identify the scope.

```
"x-cs-parameter": [
"region"
],
```

In step 506, process 500 can determine a discovery type. It is noted that online discovery is real-time and the data retrieved as is from a target cloud without persisting in the system. Offline Discovery can be near real time and event based depending on the resource action. The discovered resource data can be persisted in the system and can be consumed by various other modules such as cost, operation, security compliance, etc. Offline discovery can be used to map the relationship with other resources. An example is as follows:

```
"x-cs-attribute-online": {
"Instance_ID": "$.instancesSet.item.instanceId",
"Instance_Type": "$.instancesSet.item.instanceType",
"Lifecycle": "$.instancesSet.item.instanceLifecycle",
"Instance_State": "$.instancesSet.item.instanceState.name",
"Keypair_Name": "$.instancesSet.item.keyName",
"Public_DNS": "$.instancesSet.item.dnsName",
"Private_IP": "$.instancesSet.item.privateIpAddress",
"IPv4_Public_IP": "$.instancesSet.item.ipAddress",
"availabilityZone": "$.instancesSet.item.placement.availabilityZone"
},
"x-cs-attribute-offline": {
"imageId": "$.instancesSet.item.imageId",
"item": "$.instancesSet.item.tagSet.item",
"name": "$.instancesSet.item.instanceState.name",
"ipAddress": "$.instancesSet.item.ipAddress",
"launchTime": "$.instancesSet.item.launchTime",
"keyName": "$.instancesSet.item.keyName",
"instanceId": "$.instancesSet.item.instanceId",
"lifecycle": "$.instancesSet.item.instanceLifecycle",
"groupName": "$.instancesSet.item.groupSet.item.groupName",
"privateIpAddress": "$.instancesSet.item.privateIpAddress",
"instanceType": "$.instancesSet.item.instanceType",
"dnsName": "$.instancesSet.item.dnsName",
"availabilityZone": "$.instancesSet.item.placement.availabilityZone"
},
```

In step 508, process 500 can implement resource tagging. Resource tagging can define whether a specific resource supports tagging at the provider level. An example is as follows:

"x-cs-tag-allowed": true,

In step 510, process 500 can determine a resource relationship. Resource relationship can be of two types. It can be a direct relationship. This can be a parent/child or a dependent relationship. An example can include a an EC2 resource that is dependent on a security group.

It can be an in-direct relationship. The in-direct relationship can be of type association. An example can be an EC2 instance that is associated with an Elastic IP. An example is as follows:

```
"x-cs-relations": {
"direct": {
"DescribeVpcs": "summary_details.instancesSet.item.vpcId",
"DescribeSubnets": "summary_details.instancesSet.item.subnetId",
"DescribeNetworkInterfaces":
"summary_details.instancesSet.item.networkInterfaceSet.item.networkInterfac
eId",
"DescribeSecurityGroups":
"summary_details.instancesSet.item.groupSet.item.groupId",
"DescribeVolumes":
"summary_details.instancesSet.item.blockDevicelMapping.item.ebs.volumeId",
"DescribeAddresses":
"summary_details.instancesSet.item.networkInterfaceSet.item.association.pub
liclp",
"DescribeImages_Owner_1_self":
"summary_details.instancesSet.item.imageId"
},
"in_direct": { }
},
```

In step 512, process 500 can determine a provider unique ID. This can be the unique identifier which is used to identify the resource. As example can be as follows:

"x-cs-unique-identifier": "instanceId",

In step 514, process 500 can perform resource management actions. Resource Management Actions can be certain actions that are performed on the resource. These actions can be performed only based on certain conditions. They can be represented by the constraints in the definition. As example can be as follows:

```
"Reboot": {
"actionCategory": "VM_Actions",
"actionType": "Swagger",
"defaultValues": { },
"Swagger": {
"param": {
"InstanceId": "summary_details.instancesSet.item.instanceId"
},
"operationId": "RebootInstances"
},
"x-cs-activity-id": "RebootInstances",
"x-cs-activity_type": "update",
"x-cs-activity-parse-exp":
"$.requestParameters.instancesSet.items.instanceId",
"x-cs-activity-description": "Requests a reboot of the specified
instance"
}.
```

In some embodiments, the cloud resource model helps in reduced time for any cloud service onboarding, extend support for new cloud services without any coding effort. The CRM provides a streamlined inventory definition and representation by bringing different resource characteristics together in a structured manner. The cloud resource inventory then provides the business view to different functional teams with the following dimensions:

Operational View: Tagging Standard, Monitoring and Utilization Trend, Region and Service wise consumption details, Naming Standard, Resource Hierarchy, etc.;

Financial View: cost breakdown by region/service/cost center/workload; and

Security Posture: Threats and Vulnerabilities per Inventory element.

Inventory captures the entire life cycle of a Cloud resource and the above characteristics. The cloud resource model helps in reduced time for any cloud service onboarding, extend support for new cloud services without any coding effort.

Additional Example Computer Architecture and Systems

Figure 6:
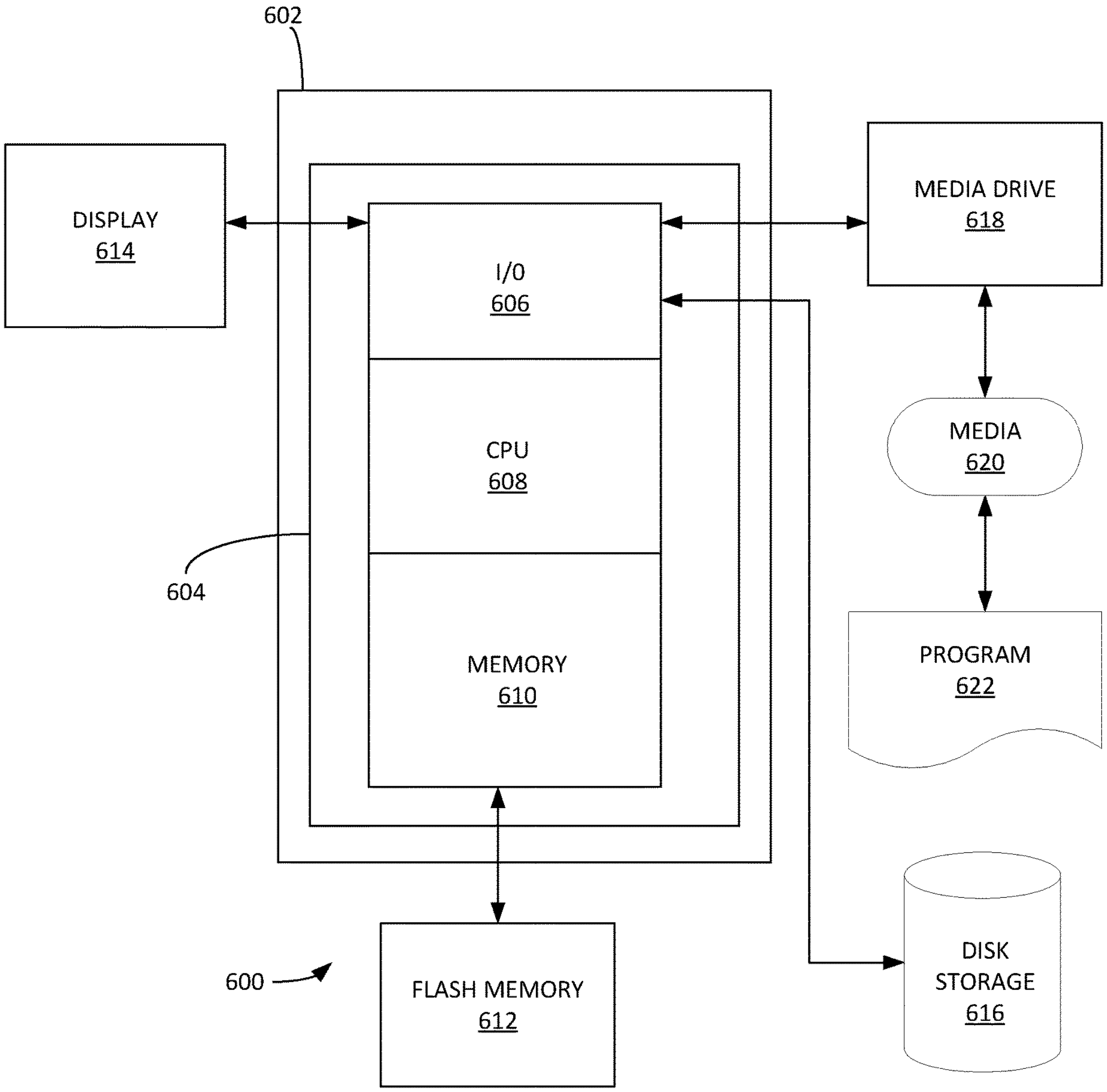
FIG. 6 is a block diagram of a sample computing environment that can be utilized to implement various embodiments.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities. Computing system 600 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A method for using a cloud resource model (CRM) for implementing a schema driven cloud resource discovery and inventory comprising:

defining a resource characteristic, a hierarchy characteristic, a dependency characteristic, and an action characteristic in a declarative model for a cloud resource;

generating the CRM comprising the resource characteristic, the hierarchy characteristic, the dependency characteristic, and the action characteristic, wherein the cloud resource model (CRM) defines, through an open API specification, a set of objects corresponding to the resource characteristic, the hierarchy characteristic, the dependency characteristic, and the action characteristic, and wherein the CRM modeler interprets the set of objects during a cloud-resource discovery process to dynamically discover object instances for inclusion in a cloud resource inventory; and embedding the CRM in an open API specification such that the CRM and the set of objects are defined by a cloud resource modeler through the open API specification;

forming the CRM and the set of objects in the CRM into the cloud resource inventory upon completion of the cloud-resource discovery process;

wherein the cloud resource inventory comprises a unified representation of any cloud resource that has many characteristics based on every organizations business objectives, wherein the CRM modeler interprets each object defined in the CRM and dynamically discovers each object during the cloud-resource discovery process, wherein the CRM modeler enables a computing system to understand and discover a capability and a characteristic of a cloud service and a cloud-service resource, wherein the cloud-resource discovery process comprises:

discovering resource characteristics and metadata of the cloud-service resource, discovering one or more direct or indirect relationships defined in the cloud-resource model, and performing relationship-based discovery based on the discovered relationships to discover a child and/or associated cloud-service resource, wherein the relationship-based discovery is performed recursively, wherein the hierarchy characteristic and the dependency characteristic defines one or more resource relationships comprising at least one direct relationship including a parent/child relationship or a dependent relationship and at least one indirect relationship including an association relationship, wherein the CRM modeler interprets the resource relationships during the cloud-resource discovery process to dynamically discover related objects in the CRM, wherein embedding the CRM in the open API specification comprises:

defining, in the open API specification, a provider endpoint definition, an authentication definition, and one or more resource action definitions with associated constraints, and with the CRM modeler, interpreting the provider endpoint definition, the authentication definition, and the one or more resource action definitions to perform schema-based cloud-resource discovery without connector-specific coding.

2. The method of claim 1, wherein the CRM comprises a resource hierarchy object.

3. The method of claim 2, wherein the CRM comprises a relationship object, wherein the relationship object comprises a dependency hierarchy.

4. The method of claim 3, wherein the CRM comprises a dependencies object.

5. The method of claim 4, wherein the CRM comprises a stock keeping unit (SKU) object.

6. The method of claim 5, wherein the CRM comprises a pricing object.

7. The method of claim 6, wherein the CRM comprises a metric object.

8. The method of claim 7, wherein the CRM comprises an action object.

9. The method of claim 8, wherein the set of embedded operations represents a REST API structure of a cloud-resource provider.

* * * * *